Aug. 1, 1933.    W. A. FORD    1,920,785
HIGH FREQUENCY CURRENT MEASURING APPARATUS
Filed Nov. 1, 1929
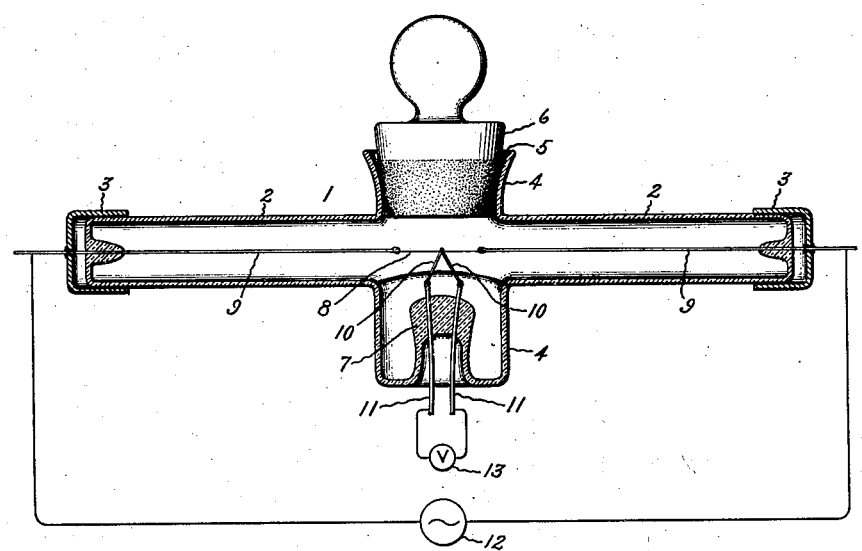
Inventor:
Warren A. Ford,
by Charles E. Tullar
His Attorney.

Patented Aug. 1, 1933

1,920,785

UNITED STATES PATENT OFFICE 1,920,785

HIGH FREQUENCY CURRENT MEASURING APPARATUS

Warren A. Ford, Schenectady, N. Y., assignor to General Electric Company, a Corporation of New York Application November 1, 1929. Serial No. 404,194

1 Claim. (Cl. 136—4)

The present invention relates to measuring apparatus, more particularly to devices for measuring alternating current of ultrahigh radio frequencies.

Devices of this character usually employ a resistance wire in heat responsive relation to the junction of a thermocouple so that the voltage generated across the legs of the couple represents a measure of the current flowing through the wire. The thermocouple ordinarily takes the form of an inverted V and is spot welded at the junction of the heater wire so as to offer rigidity to the structure. In the past it has been the practice to weld or otherwise connect the heater and the junction of the thermocouple together and to mount the unit with all the leading-in conductors in a reentrant stem, finally to join the stem to the envelope. However, when the elements are mounted in this manner, the leading-in conductors are necessarily positioned in parallel relation which construction introduces appreciable capacity between the wires. The presence of the capacity causes error in the readings and precludes accurate measurement of the current flowing through the heater wire, particularly when the current is of relatively small amplitude and of exceedingly high frequency.

Objects of the invention are to devise a meter of the kind referred to which will give an accurate measurement of current of radio frequencies; to improve the manufacturing technique of high frequency alternating current meters and to devise a construction which lends itself readily to repair in case it is necessary. In carrying my invention into effect, I propose to modify the prior art construction in such manner as substantially to reduce or preferably entirely to eliminate the inter-lead capacity, also to provide a construction which offers ready access to the interior of the device in order to effect repairs or changes. The invention will be better understood when reference is made to the drawing which shows partly in cross section an elevational view of the improved apparatus.

In the drawing, numeral 1 indicates an envelope preferably of boro silicate, pyrex or quartz, or other material containing practically no metal, evacuated to a degree of vacuum sufficiently high to preclude oxidation of the metal members within the envelope e. g. 20 cm. Hg. The latter takes the general form of a cross in which one pair of oppositely disposed arms 2, 2 are made preferably of tubing, relatively long and of small diameter and the other pair 4, 4 are relatively short and of large diameter. The extreme ends of the longer arms 2, 2 are hermetically sealed and each carries a metal reinforcing cap 3 cemented thereto. The arms 4, are positioned approximately mid-way of the caps 3 and preferably are attached to the tubing 2 in such a manner that one of the arms provides a large round opening 5 which terminates in a flaring mouth. A ground glass stopper 6 fits tightly in the mouth and when coated with vaseline or similar substance is adapted to serve as an effective seal at this position. The other arm 4 terminates in a reentrant stem 7 and is permanently sealed. The envelope contains a heater wire 8 of relatively small gage through which the currents to be measured are passed, the wire being disposed preferably in the central axis of the tubing 2 and held in position by means of rigid conductors 9, 9 of non-magnetic material, for example tungsten. The wires 9 are of minimum gage consistent with the desired degree of stiffness when the length of tubing 2 is considered. There is a thermocouple 10 of the usual form positioned in heat responsive relation to the heater wire 8; the thermocouple ordinarily is welded at the apex to the wire in order to lend rigidity to the structure as a whole. Leading-in conductors 11, 11, for the thermocouple are fused in the stem 7. When a voltage from a high frequency current source indicated generically at 12, is impressed across the extremities of the oppositely disposed conductors 9, 9, the heat from the wire 8 is communicated to the thermocouple and an electromotive force generated in the conductors 11, 11, which may be measured by a meter 13. The meter readings may be calibrated in terms of current flowing through the wire in the well understood manner.

It will be noted that the conductors 9, 9 are disposed rectilinearly and the areas presented to one another are exceedingly small so that there is a minimum amount of capacity there between and in the event that currents of radio or ultra-high frequencies are passed through the heater wire the readings obtained are strictly accurate. It will also be observed that the current leakage distances along the glass walls of the tubing 2 between the conductors 9, 9 are extremely long which lends additional accuracy to the meter indications. In the prior art devices, all of the leads were taken into the envelope through a single stem on account of technique requirements and other reasons and the appreciable distributed capacity between the leads, also the relatively short leakage distances along the surfaces of the stem precluded accurate determinations. By reason of the improved technique of construction as will be described presently not only is the capacity kept low but the current leakage distance may be made as long as desired.

The improved method of construction consists in first sealing the conductors 9, 9 and 11, 11 into the envelope and forming the thermocouple and heater wire as a unit by welding the apex of the couple to the mid-point of the wire, finally removing the stopper 6 and soldering the four extremities of the unit through the opening 5 to the adjacent extremities of the leads. Vaseline or other suitable substance impervious to air may be applied to the stopper which is then forced into the opening 5 to form an effective seal. The envelope may be evacuated by a rough pump to any desired degree of vacuum. When repairs are to be made on the thermocouple and heater unit, the stopper is removed and the soldered joints melted to enable the unit to be withdrawn. It will be apparent that the opening 5 should be sufficiently large to allow access to all of the joints and that the presence of the opening provides for the complete positioning of the members within the envelope so that the tubing 2 may be extended to any practical length in order to reduce current leakage losses.

What I claim as new and desire to secure by Letters Patent of the United States is:

In apparatus for measuring alternating current of radio frequencies, a hermetically sealed envelope constituted of a relatively long glass tubing closed at both ends, an arm projecting substantially normal to and substantially from the middle of said tubing and terminating in a reentrant stem, a heater member and thermocouple within the envelope, leading-in wires for the heater member passing substantially in rectilinear alignment through the ends of the glass tubing, leading-in wires for the thermocouple fused in the reentrant stem, said glass tubing being provided with an opening of a size sufficient to allow access to the junctions between the said wires and the heater member and also the thermocouple, said opening being in alignment with said junctions and adapted to be hermetically closed.

WARREN A. FORD.